(12) United States Patent
Cowger et al.

(10) Patent No.: US 8,708,013 B2
(45) Date of Patent: Apr. 29, 2014

(54) PNEUMATIC TIRES INCLUDING SHORT FIBERS

(75) Inventors: Katharine M. Cowger, Medina, OH (US); Richard J. Wright, Wadsworth, OH (US); John P. Rodak, Canton, OH (US); Carolyn W. Bernstorf, Wadsworth, OH (US)

(73) Assignee: Bridgeston Americas Tire Operations, LLC, Nashville, TN (US)

( * ) Notice: Subject to any disclaimer, the term of this patent is extended or adjusted under 35 U.S.C. 154(b) by 1636 days.

(21) Appl. No.: 11/507,716

(22) Filed: Aug. 21, 2006

(65) Prior Publication Data

US 2007/0044882 A1 Mar. 1, 2007

Related U.S. Application Data

(60) Provisional application No. 60/710,633, filed on Aug. 22, 2005.

(51) Int. Cl.
*B60C 1/00* (2006.01)
*B60C 13/00* (2006.01)
*C08K 7/02* (2006.01)
*B60C 15/06* (2006.01)

(52) U.S. Cl.
CPC ............... *B60C 1/0025* (2013.04); *B60C 13/00* (2013.01); *B60C 2013/006* (2013.04); *C08K 7/02* (2013.01); *B60C 15/0603* (2013.04); *B60C 2001/0058* (2013.04)
USPC ........... 152/458; 152/525; 152/541; 152/547; 523/222; 524/514

(58) Field of Classification Search
USPC ................... 152/458, 525, 541, 547; 524/514; 523/222
See application file for complete search history.

(56) References Cited

U.S. PATENT DOCUMENTS

| | | | |
|---|---|---|---|
| 4,514,541 A | 4/1985 | Frances | |
| 4,588,780 A * | 5/1986 | Edwards et al. | 524/514 X |
| 4,871,004 A | 10/1989 | Brown et al. | |
| 5,225,457 A | 7/1993 | Borowczak et al. | |
| 5,830,395 A | 11/1998 | Vercesi et al. | |
| 6,255,379 B1 | 7/2001 | Hahn et al. | |
| 6,318,430 B1 | 11/2001 | Ueyoko et al. | |
| 6,427,742 B2 | 8/2002 | Oare et al. | |
| 2002/0074077 A1 * | 6/2002 | Ikeda et al. | |

FOREIGN PATENT DOCUMENTS

| | | |
|---|---|---|
| EP | 329589 | 8/1989 |
| EP | 1 310 385 | 5/2003 |
| EP | 1 666 236 | 6/2006 |

(Continued)

OTHER PUBLICATIONS

English translation of JP 2-57410 A, Feb. 27, 1990.*

(Continued)

*Primary Examiner* — Adrienne C Johnstone
(74) *Attorney, Agent, or Firm* — Shaun J. Fox; Arthur Reginelli

(57) ABSTRACT

A pneumatic tire comprising a body, a tread, a pair of bead assemblies disposed in the lower section of the body, where said bead assemblies include a bead core and a bead filler, and a pair of sidewalls, where the bead assemblies and pair of sidewalls include vulcanized rubber, and where at least one of said bead assemblies, or at least one of said sidewalls, or both said bead assemblies and sidewalls include short fibers.

12 Claims, 1 Drawing Sheet

(56) References Cited

FOREIGN PATENT DOCUMENTS

| | | | |
|---|---|---|---|
| GB | 2 329 183 | | 3/1999 |
| JP | 02057410 A | * | 2/1990 |
| JP | 2001288300 A | * | 10/2001 |
| JP | 2002155170 A | * | 5/2002 |
| JP | 2004285294 A | * | 10/2004 |

OTHER PUBLICATIONS

English machine translation of JP 2001-288300 A, Oct. 16, 2001.*
English machine translation of JP 2002-155170 A, May 28, 2002.*
English machine translation of JP 2004-285294 A, Oct. 14, 2004.*
"Kevlar Engineered Elastomer for Tire Reinforcement" by Tsimpris et al., Technical Paper No. 14C, Dupont Advanced Fibers Systems (2002).

* cited by examiner

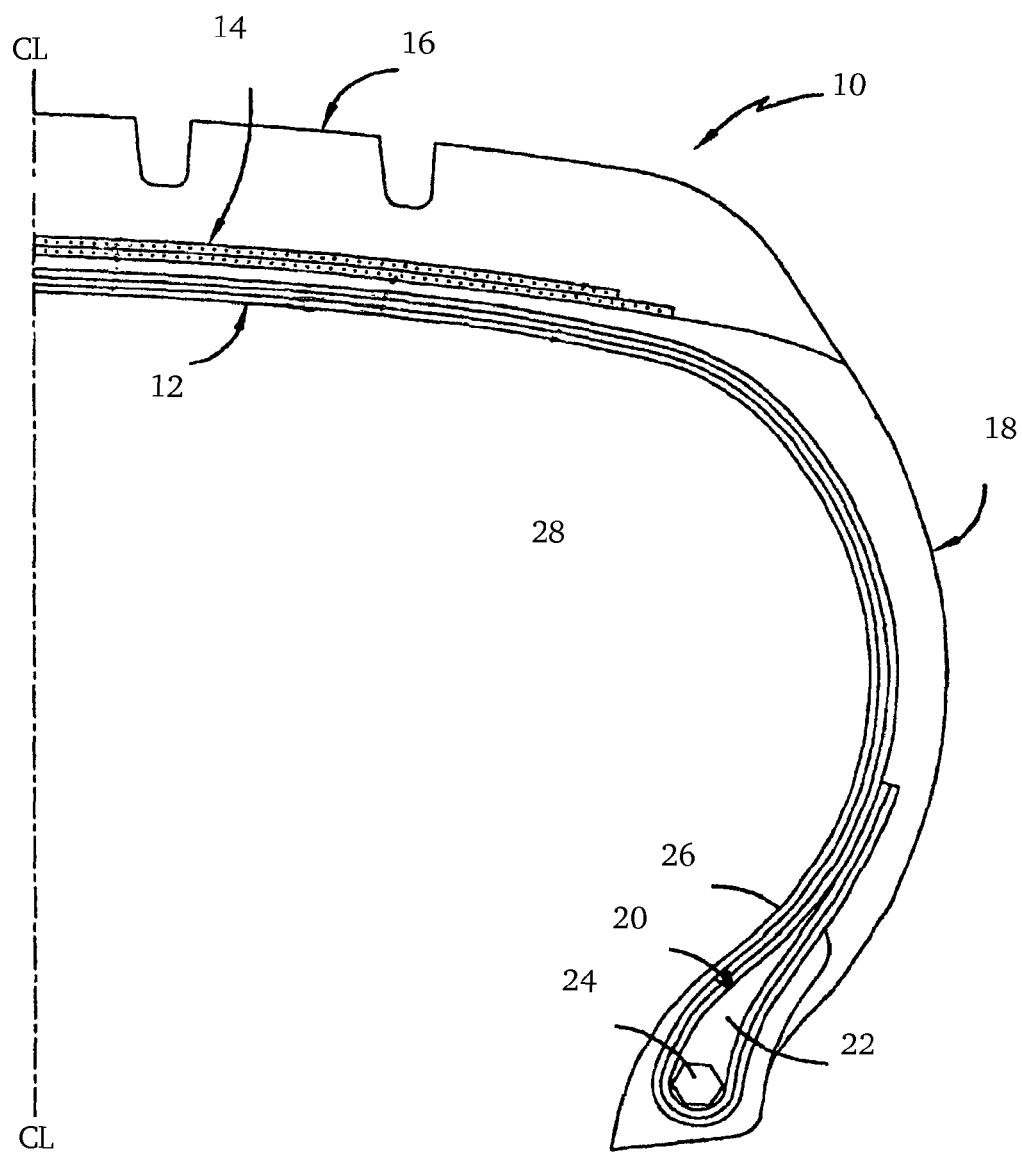

PNEUMATIC TIRES INCLUDING SHORT FIBERS

This application claims the benefit of U.S. Provisional Application Ser. No. 60/710,633, filed Aug. 22, 2005, which is incorporated herein by reference.

FIELD OF THE INVENTION

This invention relates to pneumatic tires including at least one of an improved bead filler and an improved sidewall.

BACKGROUND OF THE INVENTION

In the art of making tires, there is a desire to construct a tire having high tortional and lateral strength without deleteriously impacting radial or vertical strength. This is especially true when constructing radial tires. As those skilled in the art appreciate, radial tires have a relatively high radial strength deriving from reinforcing cords within the body ply that extend radially between a pair of axially spaced annular beads.

During operation of the tire, the sidewalls can undergo tortional and lateral stresses in addition to radial stresses. While the radial strength deriving from the radially positioned reinforcing cords can often tolerate the vertical stresses, the radial strength can also create shortcomings, especially in ride comfort.

There is therefore a need to increase the tortional and lateral strength of tires without deleteriously impacting factors associated with vertical strength.

SUMMARY OF THE INVENTION

In general the present invention provides a pneumatic tire comprising a body, a tread, a pair of bead assemblies disposed in the lower section of the body, where said bead assemblies include a bead core and a bead filler, and a pair of sidewalls, where the bead assemblies and pair of sidewalls include vulcanized rubber, and where at least one of said bead assemblies, or at least one of said sidewalls, or both said bead assemblies and sidewalls include short fibers.

BRIEF DESCRIPTION OF THE DRAWINGS

FIG. 1 is a cross-sectional view of half of a pneumatic tire according to one or more embodiments of this invention.

DETAILED DESCRIPTION OF ILLUSTRATIVE EMBODIMENTS

In one or more embodiments of this invention, at least one of the bead filler and sidewall of a tire includes short fibers.

An example of a tire according to the present invention is shown in FIG. 1. Tire 10 includes a body 12, a belt package 14, and a tread package 16. Body 12 includes a pair of sidewalls 18 extending radially inwardly from the tread and forming axial side exterior surfaces of the tire. Also included is a bead assembly 20, which includes bead filler 22 and bead ring 24. Tire 10 may also include an inner liner 26 that creates a fluid impervious chamber 28 when tire 10 is mounted on a tire rim (not shown). Only half of tire 10 is depicted in the drawings with the other half being a substantial mirror image of the half depicted. Body ply 12 includes body cords (not shown) that extend between bead ring 24 and its mirror-image bead ring (not shown), which is axially spaced from bead 24. In one embodiment, these body cords extend radially between the beads.

In one or more embodiments, the sidewall includes a vulcanizate that can be characterized by a Shore A hardness (per ASTM D2240) of less than 70, in other embodiments less than 65, and in other embodiments less than 60; in these or other embodiments, the sidewall vulcanizates can be characterized by a Shore A hardness of greater than 50, in other embodiments greater than 55, and in other embodiments greater than 60.

In one or more embodiments, the sidewall vulcanizates can be characterized by a stress at 100 percent strain (per ASTM D412) of less than 8 MPa, in other embodiments less than 7 MPa, and in other embodiments less than 6 MPa; in these or other embodiments, the sidewall vulcanizates can be characterized by a stress at 100 percent strain of greater than 2 MPa, in other embodiments greater than 3 MPa, and in other embodiments greater than 4 MPa.

In one or more embodiments, the bead filler includes a vulcanizate that can be characterized by a Shore A hardness (per ASTM D2240) of greater than 80, in other embodiments greater than 85, and in other embodiments greater than 90; in these or other embodiments, the bead filler vulcanizates can be characterized by a Shore D hardness of from about 20 to about 55, in other embodiments from about 25 to about 50, and in other embodiments from about 30 to about 45.

In one or more embodiments, the sidewall vulcanizates can be characterized by a stress at 100 percent strain (per ASTM D412) of greater than 6 MPa, in other embodiments greater than 8 MPa, and in other embodiments greater than 10 MPa; in these or other embodiments, the sidewall vulcanizates can be characterized by a stress at 100 percent strain of less than 15 MPa, in other embodiments less than 14 MPa, and in other embodiments less than 13 MPa.

In one embodiment, bead filler 22 includes short fibers disposed within a vulcanized rubber matrix. In one embodiment, a substantial portion of the short fibers within the bead filler are aligned perpendicular to the radial direction of the reinforcing cords within the body ply.

In one or more embodiments, at least a portion of sidewall 18 includes short fibers disposed within a vulcanized rubber matrix. For example, the vulcanized rubber composition in the sidewalls forming axial side exterior surfaces of the tire includes short fibers disposed within a matrix of the vulcanizated rubber. In one embodiment, a substantial portion of the short fibers within the sidewall are aligned perpendicular to the body ply cords. In one or more embodiments, both bead filler 22 and sidewall 18 include short fibers.

In one or more embodiments, the short fibers are characterized by a small diameter and high aspect ratio. For example, in one embodiment, the length of the fibers may be from about 0.1 to about 8 mm (or from about 0.7 to about 3 mm), and the ratio of length to diameter may be from about [1:]10 to about [1:]1,000 (or from about [1:]20 to about [1:]500).

In one or more embodiments, the short fibers may be highly fibrillated and include materials with very high surface area and low bulk density. Also included are particulate materials known as (fibrids). Other materials include unfibrilated fibers with a diameter of from 5 to about 15 μm and a length of from about 0.1 to about 8 mm. These unfibrilated fibers may be referred to as floc.

In one or more embodiments, the short fibers include aramid fibers including those disclosed in U.S. Pat. Nos. 5,028,372, 5,532,059, 2,999,788, and 3,018,091, which are incorporated herein by reference.

Aramid fibers include polyamide fibers where at least 85% of the amide (—CO—NH—) linkages are attached directly to two aromatic rings. In one or more embodiments, para-aramids are the primary polymers in the short fibers. An exemplary para-aramid includes poly(p-phenylene terephthalamide). As those skilled in the art recognize, poly(p-phenylene terephthalamide) can be obtained from the mole-for-mole polymerization of p-phenylene diamine and teraphthaloyl chloride. In one or more embodiments, para-aramids also include copolymers resulting from the incorporation of small amounts of other diamines with the p-phenylene diamine and small amounts of other diacid chlorides with the teraphthaloyl chloride. These particular para-aramids are disclosed in U.S. Pat. Nos. 5,830,395 and 6,068,922, which are incorporated herein by reference.

Other examples of aramid fibers include meta-aramids. An exemplary meta-aramid includes poly(m-phenylene isophthalamide). As those skilled in the art recognize, poly(m-phenylene isophthalamide) can be prepared from a mole-for-mole polymerization of m-phenylene diamine and isophthaloyl chloride. In other embodiments, copolymers resulting from the polymerization of other diamines with the m-phenylene diamine as well as other diacid chlorides with the isophthaloyl chloride may be employed. Useful meta-aramids are disclosed in U.S. Pat. Nos. 5,830,395 and 6,068,922, which is incorporated herein by reference. The aramid fibers may be a mixture of poly(p-phenylene terephthalamide) fibers and poly(m-phenylene isophthalamide) fibers.

The short aramid fibers can be coated, as by epoxy, phenolic, resorcinol-formaldehyde, polyurethane, silicone, plasticizer, or the like, or can be treated with agents which alter handling behavior, adhesion properties, static charge retention, and the like. The short aramid fibers can, also, be used in combination with other particulate materials such as carbon black, fluoropolymers, chitosan, colorants, fillers, antioxidants, and the like; and can be used with other fibers such as glass, mineral, carbon, natural (cotton, jute, ramie, and the like), synthetic (polyester, nylon, and the like), and the like. The kind, type, and concentration of additional material is not critical so long as there is no interference with the handling characteristics of the moist short aramid fibers.

The vulcanized rubber matrix into which the short fibers are dispersed may include vulcanizate compositions that are conventional in the art of fabricating bead fillers or sidewalls. In one or more embodiments, the vulcanizate composition may include, in addition to the short fibers, a vulcanized rubbery polymer, one or more fillers, one or more oils, as well as sundry other ingredients that are conventional in the art.

The sidewall or bead filler vulcanizate may be prepared by vulcanizing a rubber mixture or vulcanizable composition that includes one or more polymers that are capable of being crosslinked or vulcanized; these polymers may be referred to as rubbery polymers. Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped.

These rubbers may be cured or crosslinked by employing a multitude of rubber curing agents including, but not limited to, sulfur or peroxide-based curing systems. Curing agents are described in Kirk-Othmer, Encyclopedia of Chemical Technology, 365-468, ($3^{rd}$ Ed. 1982), particularly Vulcanization Agents and Auxiliary Materials, 390-402, and A. Y. Coran, Vulcanization in Encyclopedia of Polymer Science and Engineering, ($2^{nd}$ Ed. 1989), which are incorporated herein by reference. Vulcanizing agents may be used alone or in combination. In one or more embodiments, the process of crosslinking or vulcanizing results in a three dimensional crosslinked infinite rubber network.

Fillers that may be employed include inorganic and organic fillers. The organic fillers may include carbon black and starch. The inorganic fillers may include silica, aluminum hydroxide, magnesium hydroxide, clays (hydrated aluminum silicates), and mixtures thereof. In one or more embodiments, the sidewall or bead filer is devoid or substantially devoid of inorganic filler such as silica.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

In one or more embodiments, the sidewall vulcanizates include antioxidants, antiozonants, or both. These antioxidants and antiozonants may include those conventionally employed in the art of making tires. Examples include dialkyl-phenylene diamine, alkyl-aryl-phenylene diamine, carbamate, hindered phenol, hindered bis-phenol, aminophenol, hydroquinone, phosphite, diphenylamine, naphthylamines, alkyldiamine, aldehyde-amine condensation product, quinoline, phenylenediamine, and mixtures thereof.

In one or more embodiments, the bead filler vulcanizates include a metal adhesion promoter. These metal adhesion promoters may include those conventionally employed in the art of making tires. Examples include cobalt salts of organic acids, hydroxybenzoic acid, resorcinol, and mixtures thereof.

In one or more embodiments, the sidewalls of the present invention include at least 1, in other embodiments at least 3, and in other embodiments at least 5 parts by weight, per 100 parts by weight rubber, of the short fibers; in these or other embodiments, the sidewalls include less than 15, in other embodiments less than 12, and in other embodiments less than 10 parts by weight, per 100 parts by weight rubber, of the short fibers.

In one or more embodiments, the sidewalls of the present invention include at least 0.1, in other embodiments at least 0.3, and in other embodiments at least 0.5 parts by weight, per 100 parts by weight rubber, of the antioxidant; in these or other embodiments, the sidewalls include less than 5, in other embodiments less than 4, and in other embodiments less than 3 parts by weight, per 100 parts by weight rubber, of the antioxidant.

In one or more embodiments, the sidewalls of the present invention include at least 0.1, in other embodiments at least 0.3, and in other embodiments at least 0.5 parts by weight, per 100 parts by weight rubber, of the antiozonant; in these or other embodiments, the sidewalls include less than 5, in other embodiments less than 4, and in other embodiments less than 3 parts by weight, per 100 parts by weight rubber, of the antiozonant.

In one or more embodiments, the sidewalls of the present invention include at least 60, in other embodiments at least 70, and in other embodiments at least 80 parts by weight, per 100 parts by weight rubber, of a filler such as carbon black as recited above; in these or other embodiments, the sidewalls include less than 120, in other embodiments less than 115, and in other embodiments less than 110 parts by weight, per 100 parts by weight rubber, of a filler.

In one or more embodiments, the bead fillers of the present invention include at least 1, in other embodiments at least 3, and in other embodiments at least 5 parts by weight, per 100 parts by weight rubber, of the short fibers; in these or other embodiments, the bead fillers include less than 8, in other embodiments less than 6, and in other embodiments less than 5 parts by weight, per 100 parts by weight rubber, of the short fibers.

In one or more embodiments, the bead fillers of the present invention include at least 0.1, in other embodiments at least 0.3, and in other embodiments at least 0.5 parts by weight, per 100 parts by weight rubber, of a metal adhesion promoter; in these or other embodiments, the bead fillers include less than 5, in other embodiments less than 4, and in other embodiments less than 3 parts by weight, per 100 parts by weight rubber, of a metal adhesion promoter.

In one or more embodiments, the bead fillers of the present invention include at least 60, in other embodiments at least 70, and in other embodiments at least 80 parts by weight, per 100 parts by weight rubber, of a filler; in these or other embodiments, the bead fillers include less than 120, in other embodiments less than 115, and in other embodiments less than 110 parts by weight, per 100 parts by weight rubber, of a filler.

In one or more embodiments, the bead fillers include less than 5 parts by weight, in other embodiments less than 3 parts by weight, and in other embodiments less than 1 part by weight of a processing oil.

The bead filler and sidewall, as well as the other components of the tires of this invention may be manufactured by employing conventional procedures. In one embodiment, an initial masterbatch is prepared by mixing the rubbery polymer and filler. In one embodiment, the short fibers may likewise be mixed as part of the initial masterbatch. This initial masterbatch may be mixed at a starting temperature from about 25° C. to about 125° C. with a discharge temperature of about 135° C. to about 180° C. Scorch inhibiting agents may also be added to this initial masterbatch. Once this initial masterbatch is processed, the vulcanizing agents can be introduced and mixing continued at relatively low temperatures so as to inhibit or discourage vulcanization. The low temperature mixing of the vulcanizing agents is typically referred to as the final mix stage. Optionally, additional mixing stages, sometimes called remill, can be employed between the initial masterbatch and the final mix stage. The short fibers may be added to the mix during a remill.

Rubber compounding techniques and the additives employed therein are generally known as disclosed in Stephens, *The Compounding and Vulcanization of Rubber*, in *Rubber Technology* (2$^{nd}$ Ed. 1973). The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference.

In one or more embodiments, the short fibers are added to the vulcanizable compositions for preparing the sidewalls or bead fillers by using a polymer-fiber masterbatch. The polymer or polymeric material that is included in the masterbatch along with the short fibers may include any polymer or combination of polymers. In one or more embodiments, the polymer or combination of polymers include those that can be extruded through an extruder. Useful polymers include polyolefins such as high and low density polyethylene, polypropylene; ethylene vinyl acetate copolymers; ethylene methyl acrylate copolymers; ionomer resins; polymethylmethacrylate; polyvinylchloride; EPDM rubbers; chloroprene; copolyester elastomers; polyethyleneterephthalate; polybutylene-terephthalate; liquid crystal polymers; polyetheretherketone; polyetherketoneketone; ABS; polyphenylsulphide; polyamides; polyimides; polyurethanes; silicones; and the like.

In one or more embodiments, the polymer-fiber masterbatch may include from about 15 to about 99% by weight polymer (optionally from about 25 to about 85% by weight) polymer and from about 1 to about 85% by weight (optionally from about 15 to about 75% by weight) short fibers.

In one or more embodiments, the polymer-fiber masterbatch is characterized in that the fibers are uniformly distributed throughout the polymer material. In one or more embodiments, the polymer-fiber masterbatch is prepared by a process that feeds these short fibers into the polymeric material at a constant rate. This procedure is described in U.S. Pat. Nos. 5,830,395 and 6,068,922, which is incorporated herein by reference.

In one embodiment, the polymer-fiber masterbatch includes the polymer-fiber blend obtained under the tradename Kevlar Engineered Elastomer™ (Dupont Advanced Fibers Systems; Virginia).

In one or more embodiments, the short fibers can be partially or substantially aligned by extrusion of the vulcanizable composition containing the fibers. In one or more embodiments, the extrusion occurs through a die having a relatively thin opening. It is believed that by extruding the vulcanizable composition through a relatively narrow opening, the fibers (or a portion thereof) will align in the machine direction (i.e., parallel with the direction of extrusion).

The vulcanizable compositions of this invention can be fabricated into components and tires by employing conventional rubber shaping, molding, and curing techniques. In one or more embodiments, vulcanization can be effected by heating the vulcanizable composition within a mold. In one or more embodiments, the composition can be heated at a temperature from about 140° C. to about 180° C. The cured or crosslinked rubber compositions (i.e., vulcanizates) generally include three-dimensional polymeric networks that are thermoset. Other ingredients, such as processing aids and fillers, as well as the fibers described in this invention, are generally dispersed throughout the vulcanized network. Pneumatic tires can be made as discussed in U.S. Pat. Nos. 5,866,171, 5,875,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Experiment 1

Three sidewall vulcanizates were prepared and tested for various physical properties. Some of the ingredients employed in preparing the vulcanizates (particularly those that were varied) are shown in Table 1. The other ingredients employed in each sample were held constant. The amounts provided in Table I are represented in parts by weight.

The vulcanizable compositions employed in the preparation of Samples 1-2 were milled and cut into test samples that were then cured at about 150° C. for 4.5 minutes within a autoclave. The cured samples were then analyzed for dynamic properties both with and against the grain. In other words, measurements were taken with respect to the direction of extrusion (i.e., the machine direction) and with respect to a direction perpendicular to extrusion (i.e., in the cross machine direction). The results of this analysis are also provided in Table I.

TABLE I

|  | Sample | | |
| --- | --- | --- | --- |
|  | 1 | 2 | 3 |
| Natural Rubber | 35.00 | 25.79 | 16.59 |
| Butadiene | 65.00 | 65.00 | 65.00 |
| Carbon Black | 55.00 | 52.25 | 49.50 |
| Polymer-Fiber Masterbatch | — | 11.96 | 23.91 |
| Amounts within Masterbatch | | | |
| Short Fibers | 0.00 | 2.75 | 5.50 |
| Masterbatch Polymer | 0.00 | 9.21 | 18.41 |
| Analytical Data | | | |
| E' @ 30° C. | | | |
| Width | 6.5 | 17.6 | 16.3 |
| Against | 6.3 | 9.6 | 12.6 |
| Tanδ @ 60° C. | | | |
| Width | 0.181 | 0.141 | 0.138 |
| Against | 0.180 | 0.153 | 0.139 |

The polymer-fiber masterbatch was obtained under the tradename KEVLAR ENGINEERED ELASTOMERS™ (DuPont), and was characterized by including about 23% by weight short aramid fibers (i.e., Kevlar fibers sold by DuPont) and about 77% by weight natural rubber. It is noted that Table I provides information on the total amount of polymer-fiber masterbatch added as well as the parts by weight of each of the fiber and masterbatch polymer within the composition resulting from the addition of the masterbatch.

Temperature sweep experiments were conducted with a frequency of 31.4 rad/sec using 0.5% strain for temperature ranging from −100° C. to −10° C., and 2% strain for the temperature ranging from −10° C. to 100° C. A frequency of 3.14 rad/sec was used for strain sweep which is conducted at 65° C. with strain sweeping from 0.25% to 14.75%.

Experiment 2

A sample tire was constructed that included 5.5 parts by weight short aramid fibers per 100 parts by weight rubber within the sidewall. This tire was tested for lateral and tortional strength and compared to a tire of similar composition and construction but for the presence of the short fibers. As with the previous experiment, the sidewall including the short fibers was constructed by adding a polymer-fiber masterbatch obtained under the tradename KEVLAR ENGINEERED ELASTOMERS™ (DuPont).

The tortional and lateral strength of the tire was tested by employing the Lateral and Fore/AFT Spring rate test pursuant to standardized testing. The test was conducted at a test load of 1,477 lbs., a test inflation of 35 psi, a test temperature of 75° F. (+/−3° F.) and a test speed for lateral and fore/aft deflection of 4 inches per minute and a vertical deflection of 2 inches per minute.

The results of the tests is provided in Table II. Sample 4 is the control, which did not include any short fibers within the sidewall. Sample 5 short aramid fibers within the sidewall.

TABLE II

|  | Sample | |
| --- | --- | --- |
|  | 4 | 5 |
| Fore/Aft lb/in | 1475 | 1560 |
| Lateral lb/in | 697.6 | 709 |
| Verticle lb/in | 1334 | 1359 |
| Fore/Aft (%) | 100 | 106 |
| Lateral (%) | 100 | 102 |
| Verticle (%) | 100 | 102 |

Various modifications and alterations that do not depart from the scope and spirit of this invention will become apparent to those skilled in the art. This invention is not to be duly limited to the illustrative embodiments set forth herein.

What is claimed is:

1. A pneumatic tire comprising:
    a body;
    a tread;
    a pair of bead assemblies disposed in the lower section of the body, where said bead assemblies include a bead core and a bead filler; and
    a pair of sidewalls extending radially inwardly from the tread and forming axial side exterior surfaces of the tire, where the bead assemblies and pair of sidewalls include vulcanized rubber, and where said vulcanized rubber composition in said sidewalls forms said axial side exterior surfaces of the tire and includes at least 60 parts by weight carbon black per hundred parts by weight rubber and includes at least 5 parts by weight and less than 10 parts by weight per hundred parts by weight rubber of aramid short fibers in a matrix of said vulcanized rubber.

2. The pneumatic tire of claim 1, where said short fibers have a length of from about 0.1 to about 8 mm.

3. The pneumatic tire of claim 2, where said short fibers have a length of from about 0.7 to about 3 mm.

4. The pneumatic tire of claim 2, where said short fibers have an aspect ratio of length to diameter of from about 10 to about 1,000.

5. The pneumatic tire of claim 1, where said short fibers are fibrillated.

6. The pneumatic tire of claim 1, where said fibers are coated with epoxy, phenolic, resorcinol-formaldehyde, polyurethane, silicone, or plasticizer coatings.

7. The pneumatic tire of claim 1, where said sidewalls include an antioxidant, an antiozonant, or both an antioxidant and antiozonant.

8. The pneumatic tire of claim 1, where said sidewall is characterized by a Shore A hardness per ASTM-D2240 of less than 70.

9. The pneumatic tire of claim 1, where said sidewall is characterized by a Shore A hardness per ASTM-D2240 of less than 65.

10. The pneumatic tire of claim 1, where said sidewalls are characterized by a stress at 100% strain per ASTM-D412 of less than 8 MPa.

11. The pneumatic tire of claim 1, where said sidewalls are characterized by a stress at 100% strain per ASTM-D412 of less than 7 MPa.

12. The pneumatic tire of claim 1, where said aramid fibers are selected from the group consisting of poly(p-phenylene terephthalamide) fibers, poly(m-phenylene isophthalamide) fibers, and mixtures thereof.

* * * * *